United States Patent
Gordon et al.

(10) Patent No.: US 9,704,535 B2
(45) Date of Patent: Jul. 11, 2017

(54) SYSTEMS AND METHODS FOR ENABLING INTERACTION WITH MULTI-CHANNEL MEDIA FILES

(71) Applicant: SCORE ADDICTION PTY LTD, Manly, New South Wales (AU)

(72) Inventors: Luke Gordon, Manly (AU); Mark Havryliv, Manly (AU)

(73) Assignee: SCORE ADDICTION PTY LTD, Manly, New South Wales (AU)

( * ) Notice: Subject to any disclaimer, the term of this patent is extended or adjusted under 35 U.S.C. 154(b) by 66 days.

(21) Appl. No.: 14/766,027

(22) PCT Filed: Feb. 7, 2014

(86) PCT No.: PCT/AU2014/000094
§ 371 (c)(1),
(2) Date: Aug. 5, 2015

(87) PCT Pub. No.: WO2014/121336
PCT Pub. Date: Aug. 14, 2014

(65) Prior Publication Data
US 2015/0380053 A1    Dec. 31, 2015

(30) Foreign Application Priority Data

Feb. 7, 2013    (AU) .................................. 2013900387

(51) Int. Cl.
*H04N 5/765*    (2006.01)
*H04N 5/93*    (2006.01)
(Continued)

(52) U.S. Cl.
CPC .......... *G11B 27/038* (2013.01); *G11B 27/034* (2013.01); *G11B 27/34* (2013.01);
(Continued)

(58) Field of Classification Search
CPC . G11B 27/038; H04N 21/47205; H04S 3/002; H04S 2400/01; H04S 2400/15
(Continued)

(56) References Cited

U.S. PATENT DOCUMENTS

2001/0055398 A1*  12/2001  Pachet ................... G10K 15/00
                                                              381/80
2006/0259862 A1   11/2006  Adams et al.
(Continued)

OTHER PUBLICATIONS

International Search Report for PCT/AU2014/000094, ISA/AU, mailed May 2, 2014.

*Primary Examiner* — Robert Chevalier
(74) *Attorney, Agent, or Firm* — Harness, Dickey & Pierce, P.L.C.

(57) ABSTRACT

Described herein are systems and methods for enabling interaction with multi-channel media files. For example, embodiments include computer implemented methodologies that are implemented in the context of media editing software (for example a video editing suite). In some cases the methodologies are performed by way of a plug-in, which modifies the operation of pre-existing media editing software. In other cases the methodologies are integrated into media editing software. Alternate implementation approaches may also be used thereby to achieve corresponding functionalities.

21 Claims, 8 Drawing Sheets

(51) Int. Cl.
  *G11B 27/038*   (2006.01)
  *G11B 27/034*   (2006.01)
  *G11B 27/34*    (2006.01)
  *H04N 21/472*   (2011.01)
  *H04S 3/00*     (2006.01)

(52) U.S. Cl.
  CPC ....... *H04N 21/47205* (2013.01); *H04S 3/002* (2013.01); *H04S 2400/01* (2013.01); *H04S 2400/15* (2013.01)

(58) Field of Classification Search
  USPC ....... 386/232, 248, 230, 278, 284, 285, 280, 386/281
  See application file for complete search history.

(56) References Cited

U.S. PATENT DOCUMENTS

2007/0198551 A1    8/2007  Barnes et al.
2010/0241845 A1*   9/2010  Alonso ................ H04L 9/3231
                                                    713/150

* cited by examiner

SYSTEMS AND METHODS FOR ENABLING INTERACTION WITH MULTI-CHANNEL MEDIA FILES

CROSS-REFERENCE TO RELATED APPLICATIONS

This application is a 371 U.S. National Stage of International Application No. PCT/AU2014/000094, filed Feb. 4, 2014, which claims the benefit of and priority to Australian Patent Application No. 2013900387, filed Feb. 7, 2013. The disclosures of the above applications are incorporated herein by reference.

FIELD OF THE INVENTION

The present invention relates to systems and methods for enabling interaction with multi-channel media files. Embodiments of the invention have been particularly developed for enabling a user to manipulate multi-channel media files in the context of operating video editing software. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Video editing software has been widely adopted by a range of user groups, ranging from professionals, to enthusiasts, and to first-timers. Although the nature and complexity of video editing software suites varies greatly, a common feature is the use of separate tracks for video and audio. This enables a user to mix a desired audio track with a desired video track, and perform various advanced functions in relation to that relationship.

SUMMARY OF THE INVENTION

It is an object of the present invention to overcome or ameliorate at least one of the disadvantages of the prior art, or to provide a useful alternative.

One embodiment provides a method for processing media data, the method including:

(i) receiving a buffer of first-format samples from an audio track that is placed in a media editing platform;

(ii) in response to the received first-format samples, obtaining a set of corresponding second-format samples from a multi-channel audio file; and (iii) mixing the obtained second-format samples based on a set of mixing parameters, thereby to define a new buffer of first-format samples derived from the mixing of the second-format samples; and (iv) outputting the new buffer of first-format samples.

One embodiment provides a method for enabling mixing of a multi-channel file, the method including:

(a) defining a graphical layout including a plurality of spaces, each space corresponding to either:
  (i) a single channel of the multi-channel file; or
  (ii) a combination of channels of the multi-channel file;

(b) based upon user input, defining one or more automation tracks, wherein each automation track defines time-specific values for facilitating mixing control; and (c) mixing the multi-channel file based on the time-specific values, such that relative intensities of the channels is determined the time specific values.

One embodiment provides a computer implemented method for enabling dynamic tempo control of a track that is to be mixed, the method including:

determining a number of samples s required to be outputted from a mixing process for a timeline segment;

determining a tempo parameter t associated with the timeline segment;

mixing s*t samples from a source file thereby to define s*t mixed samples;

performing a tempo compression process thereby to convert the s*t mixed samples into s mixed samples having a tempo associated with the tempo parameter.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Figure 1A:
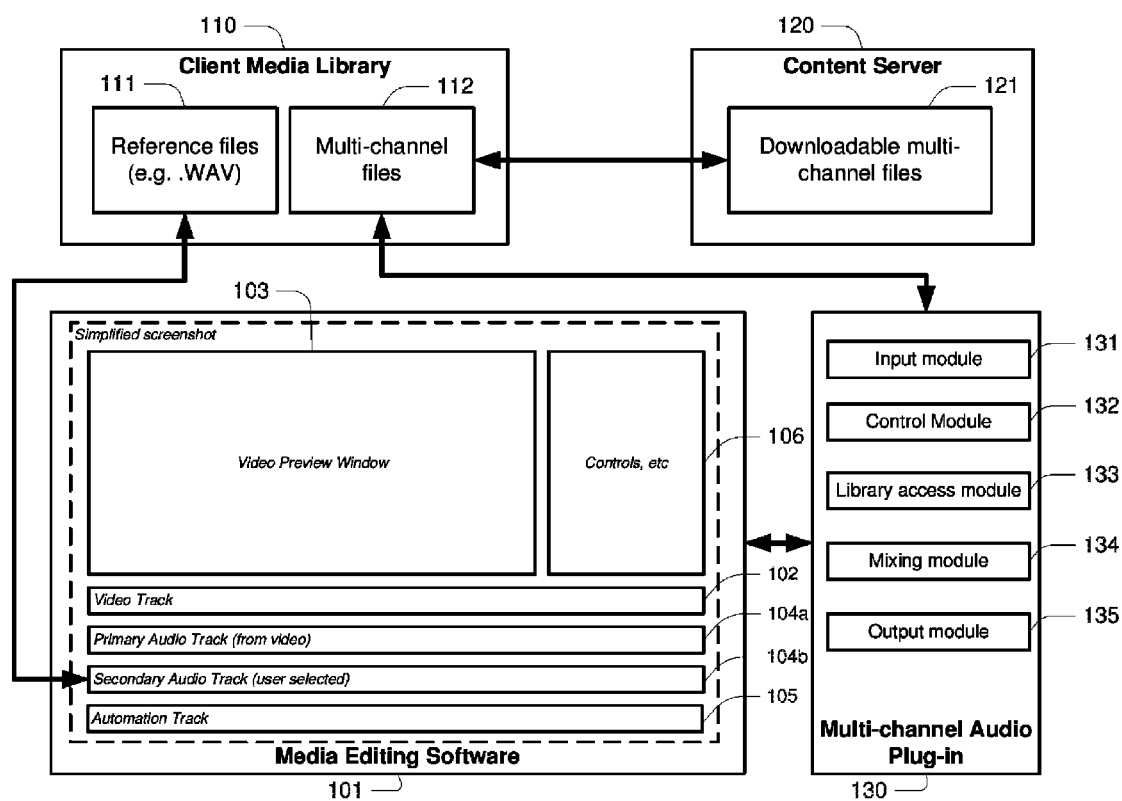
FIG. 1A schematically illustrates a framework according to one embodiment.

Described herein are systems and methods for enabling interaction with multi-channel media files. For example, embodiments include computer implemented methodologies that are implemented in the context of media editing software (for example a video editing suite). In some cases the methodologies are performed by way of a plug-in, which modifies the operation of pre-existing media editing software. In other cases the methodologies are integrated into media editing software. Alternate implementation approaches may also be used thereby to achieve corresponding functionalities.

General Overview

The technologies and methodologies used herein are primarily directed towards enabling users to make use of multi-channel audio files in the context of video editing.

The term "multi-channel file" as used herein refers to an audio file in which there are multiple channels each corresponding to respective musical aspects (and may be referred to as a "multiple musical aspect channel file"). For example, musical aspects may be defined by reference to instruments, musical roles played by certain instruments, percussion aspects (such as bass percussion, snares, glitch percussion, and so on), and a range of other musical artifacts. It will be appreciated that the defining of musical aspects is a subjective (and predominately artistic) task performed when initially creating a multi-channel file.

It will be appreciated that conventional audio files (such as WAV or MP3 files) may have multiple "speaker channels", for example in the context of stereo sound files, or files defined in accordance with a surround sound protocol. Those are not considered to be "multi-channel files" as discussed herein, and are instead regarded as "multiple-speaker-channel files". The term "multi-channel file" may be interchanged with the term "multiple musical aspect channel file" if such additional specific clarity is required. In some embodiments a multi-channel file includes around 20 channels, however it will be appreciated that theoretically any number of channels could be used.

An underlying rationale is that such multi-channel audio files may be subjected to advanced mixing techniques, thereby to provide an audio track that is well suited to a video project. For example, the multi channel file may have separate channels for individual musical aspects, which are able to be mixed in various manners thereby to provide artistic/dramatic effect.

In some embodiments, the technologies and methodologies are directed to situations where video editing software is configured to deal only with conventional audio files, which may be either stereo or mono (or in some cases defined in terms of a surround sound protocol). In such cases, a plug-in may be provided which enables real-time mixing of a multi-channel file on an as-required basis. In embodiments discussed further below, this includes using a reference file as a prompt for mixing.

In some embodiments, the technologies and methodologies are directed to additionally operate in situations where video editing software is natively adapted to operate with multi-channel audio files. Aspects of the technology relevant to this situation include mixing techniques and user interfaces.

Exemplary Framework

FIG. 1A illustrates a framework according to one embodiment. This includes an exemplary media editing software product, in the form of a generically described editor 101, which is illustrated by way of a simplified conceptual screenshot. Editor 101 is intended to represent substantially any Digital Audio Workstation, nonlinear film editing software package video/audio sequencing software, or the like. In the interests of simplicity, only a few key features of editor 101 are illustrated. These are:

- A video track 102. This is a component of the user interface which contains a video track, which may be defined by reference to video components of one or more video files. These may be trimmed, cut, combined, and/or subjected to other video editing techniques in the process of editing. In essence, the video track provides a timeline of video frames for an in-progress project.
- A video preview window 103. This provides a preview of video frames in video track 102 (for example a pre-rendering preview).
- A primary audio track 104a. This is a component in the user interface that includes an audio track associated with the video track. The audio track is preferably trimmed, cut, combined, and/or subjected to other editing techniques automatically in a corresponding manner to the video track. That is, if the video track is cut, a corresponding cut is made to the primary undo track such that the audio and video remain synchronised.
- A secondary audio track 104b. This is a component in the user interface that includes a user-selected audio track, for example by reference to a .WAV audio file. The audio track may also be trimmed, cut, combined, and/or subjected to other editing techniques in the process of editing. As discussed further below, the audio track may be a "reference file" used for the purpose of multi-channel mixing as discussed herein.
- An automation track 105. This is used to drive automation, for example in the context of plug-ins and/or other processing features that are configured to accept input from an automation track. In some embodiments there are multiple automation tracks. For example, an embodiment considered further below two automation tracks are used to respectively control x-axis and y-axis parameters of musical mixing.
- Controls 106, which collectively describe the wide range of user interface controls made available by editor 101.

Figure 1B:
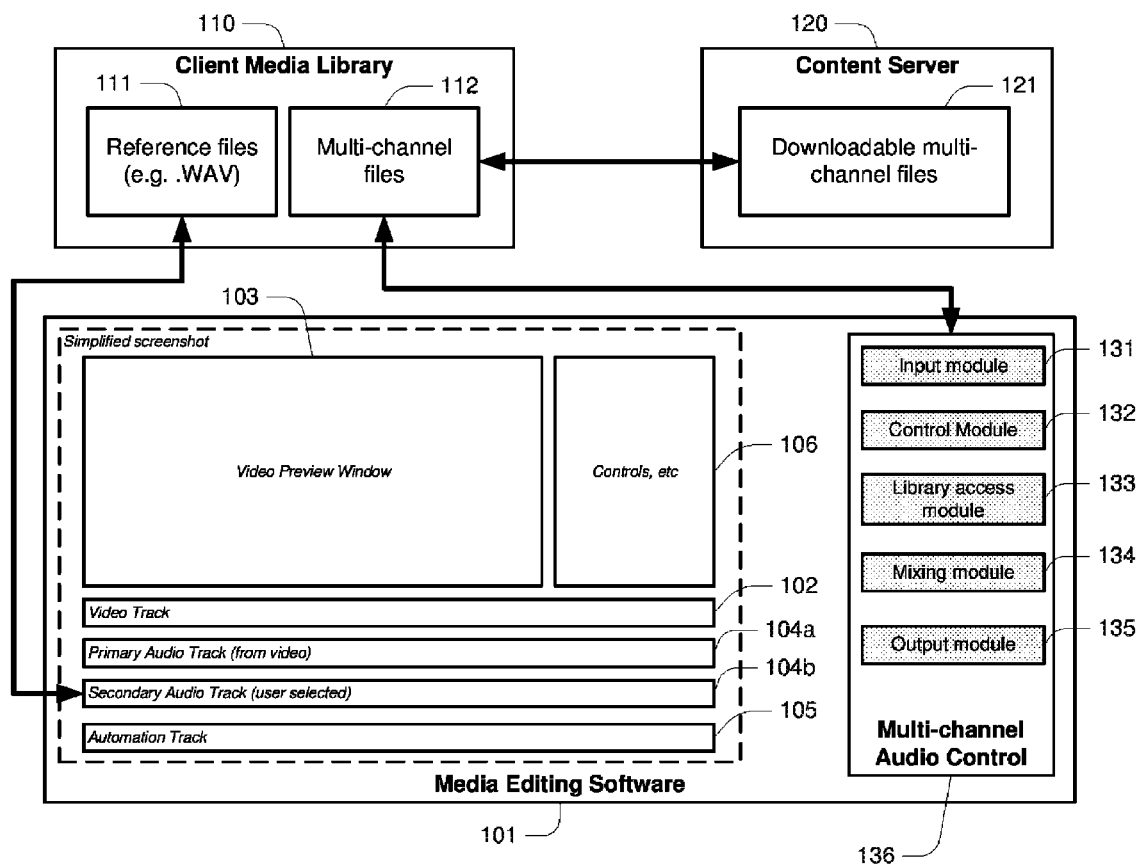
FIG. 1B schematically illustrates a framework according to one embodiment.

In the context of this embodiment, multi-channel audio is managed by way of reference files 111 (which are preferably conventional files, such as .WAV files) and multi-channel files 112. In this regard, each multi-channel file has a respective associated reference file. These are each stored in a media library, which may be based either locally (such as in a client media library 110 as illustrated in FIG. 1B) or remotely (for example by way of a cloud based media service, or by way of download from a content server). In some embodiments a reference file may be defined on an as-needed basis.

In the example of FIG. 1A, the reference file is preferably configured to be imported using conventional techniques into a standard audio track 104b. Accordingly, the reference file preferably includes standard .WAV file headers, and in one embodiment has the following attributes:

Sampling rate=48 kHz.
Bit-depth=24 bit.
Channels=2.

It will be appreciated that other attributes may be used in further embodiments (for example a bit-depth of 16 bit, a higher sampling rate, and so on). In some embodiments, for ease of manipulation, the reference file contains a representation of the waveform of the source multi-channel file to which it refers. That is, it includes a waveform representing a normalised (i.e. unmixed) version of the multi-channel file, which is suitable for standalone playback (i.e. it operates and performs as a conventional stereo audio file).

Although each multi-channel file has a respective associated reference file, in some embodiments, as discussed below, a user is able to switch between multi-channel files without changing the reference file in track 104b.

FIG. 1A also illustrates a multi-channel audio plug-in 130 (defined by computer executable code and illustrated by reference to logically identifiable software modules). This plug-in operates in conjunction with media editing software 101 thereby to provide non-native functionalities to that software application. It will be appreciated that multiple versions of plug-in 130 may be produced to operate with different media editing software packages, based on those packages' respective plug-in requirement and integration protocols.

Plug-in 130 includes an input module 131, which is configured to receive input from media editing software 101. For example, editor 101 obtains s samples of the reference file from track 104b, and these are sent to plug-in 130 (which is preferably configured to be the first plug-in in a plug-in chain) either at the time of rendering or at the time of preview rendering (preferably at both preview and final rendering). A library access module 133 is configured to decode the buffer of the reference file provided to input 131, thereby to retrieve location and filename information. The filename information is used to select the correct multi-channel file (being the multi-channel file associated with the reference file in-use). A control module 132 enables a user to control parameters associated with multi-channel audio mixing, as discussed in more detail further below. This configures a mixing module 134 to mix the relevant multi-channel file in accordance with the user's defined parameters, and in doing so generate a stereo buffer. This stereo buffer is returned to editor 101 via an output module 135.

In the embodiment of FIG. 1B, media editing software 101 includes a multi-channel audio control module 136 as opposed to plug-in 130. In this manner, editor 101 is natively configured to provide functionalities corresponding to those of plug-in 130.

Additional details regarding the operation of plug-in 130 or control module 136 are described further below.

Exemplary Methodologies

Figure 2A:
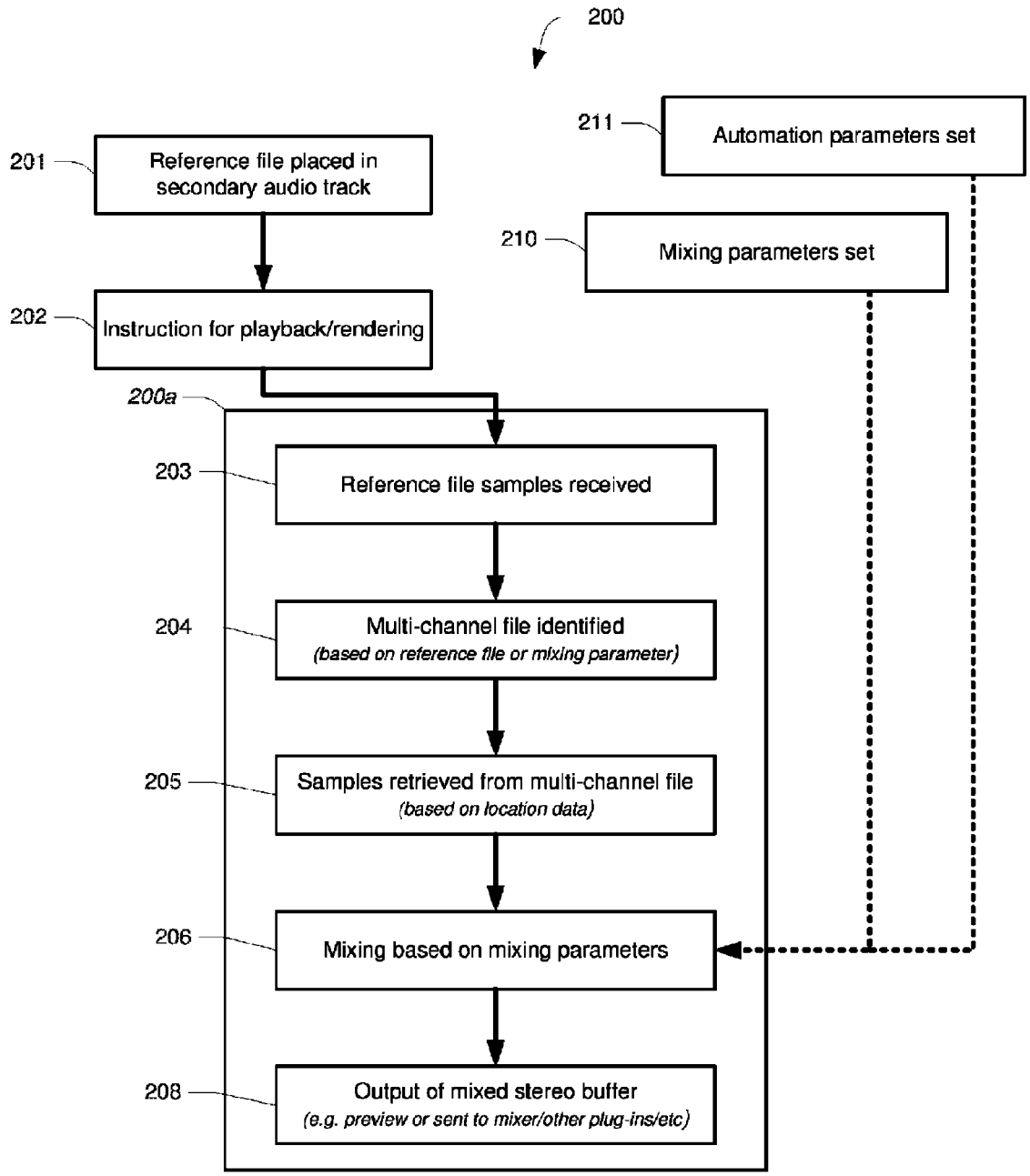
FIG. 2A illustrates a method according to one embodiment.

FIG. 2A illustrates a method 200 according to one embodiment. This method is optionally performed via media editing software (for example in combination with a plug-in such as plug-in 130, or via an arrangement similar to FIG. 1B). Steps of method 200 are preferably performed by the execution of computer executable code (i.e. software instructions) via one or more processors of a computer system.

Functional block 201 represents a process including the placement of a reference file 111 in secondary audio track 104b. The precise manner in which this is performed depends on the nature of the editing software. For example, in some cases an audio file, such as the reference file, is able to be manipulated via "drag and drop" onto audio track 104b. Functional block 201 represents a process including receiving an instruction for playback or rendering of media in the editing software, being either a plurality of tracks (e.g. video and audio) or singly the secondary audio track. This triggers sub-process 200a (for example by virtue of samples of the secondary audio track being delivered to a plug-in 130, or a corresponding native process).

It will be appreciated that the processes represented by functional blocks 201 and 202 need not be performed adjacent in time to one another; these are performed at the discretion of a user.

Functional block 210 represents a process including the setting of mixing parameters. For example, this is a result of user interaction with a mixing parameter module, for example a module having characteristics similar to those shown in the screenshot of FIG. 4 (described in more detail further below). In overview, a user selects parameters that will control automated mixing, for example in terms of how various individual channels should be combined, accentuated, and so on. In some embodiments automated mixing is driven by an automation track (such as track 105) or other automation parameters. Such automation tracks/parameters are preferably defined by reference to a timeline thereby to cue events or phases in edited media. For example, an "intensity line" may be used to designate variations in desired music intensity over the course of edited media. The automation parameters may also include cues, which are events defined relative to the media timeline, and may be used to drive particular parameter changes and/or effects. In the context of FIG. 2A, functional block 211 represents a process including the setting of automation parameters (which may occur using plug-in 130, a further plug-in, or functionality native to the media editing software).

It will be appreciated that the processes represented by functional blocks 210 and 211 are performed at the discretion of a user at a time of the user's choosing. Dashed lines are used to indicate that results of those processes influence downstream processes represented by functional block 206.

Functional block 203 represents a process including receiving reference file samples. Depending on buffer sizes, the editor sends s samples of the reference file every $t_s$ seconds. Functional block 204 represents a process including identifying a multi-channel file. By default, this is preferably identified based on information decoded from the provided samples, which identify a file location for the multi-channel file associated with the reference track.

Functional block 205 represents a process including retrieving samples from the identified multi-channel file. In some embodiments this includes processing the received samples thereby to determine location information. This location information defines a position in the reference file (typically by reference to a predefined starting origin), which are able to be correlated to the multi-channel file. For example, if a sample from a reference file relates to a time X:YZ in the reference file, a sample at time X:YZ in the multi channel file is correspondingly obtained.

Functional block 206 represents a process including mixing the retrieved samples based on the mixing parameters defined at 210 and the automation parameters defined at 211.

For example, this may include varying relative intensities of the various channels in the multi-channel file, cross-fading between channels, and so on.

Functional block 208 represents a process including outputting a mixed stereo buffer (i.e. stereo samples) based on the mixing. That is, in effect, the mixed multi-channel audio samples are "flattened" into stereo samples. These are outputted either as a preview, or sent to a mixer, further plug-in, or the like. As a result, when the media in the media editor is played back or rendered, the audio of secondary audio track 104b is defined by the outputted mixed stereo buffer (as opposed to being a rendering of the reference file).

In some embodiments functionality is provided whereby a user is enabled to designate an alternate multi-channel file during method 200a. This enables switching between multi-channel files without needing to replace the reference file in audio track 104b. For example, a user initially selects a first multi-channel file, and defines mixing and automation parameters based on that file. Then, during the performance of method 200a, the user designates a second multi-channel file. The reference file remains unchanged, and the automation and mixing parameters defined for the first file are applied in relation to the second file (it will be appreciated that this is most effective where the two multi channel files have correspondingly numbered channels, for example common bass percussion channel numbers, and common glitch percussion channels). It will be appreciated that, in practice, such functionality is achieved by performing a process corresponding to that of block 205, but for the newly-designated file. In some cases this is provided as a "manual override" functionality, allowing manual override of a pre-designated multi-channel file. The functionality is preferably accessible in real time, thereby to enable on-the-fly previewing of different mixed tracks (mixed according to common mixing parameters and a common automation track).

Figure 3:
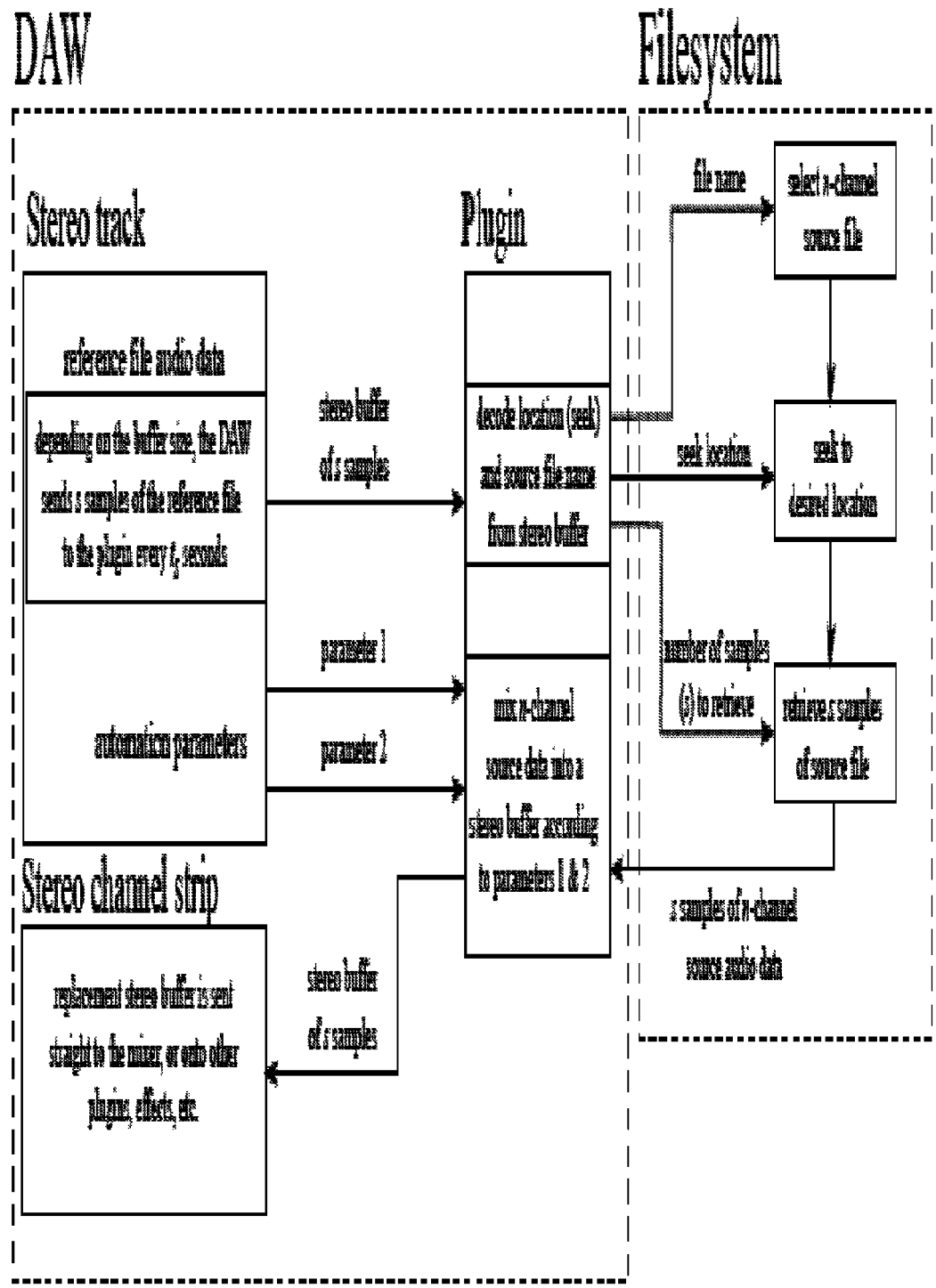
FIG. 3 illustrates a method according to one embodiment.

FIG. 3 provides a representation of an alternate process flow according to a further embodiment. This clearly shows a process whereby a stereo buffer of s samples is sent out, and a stereo buffer of s samples returned, with the former samples being derived from a reference file and the latter samples being derived from mixing of a multi-channel file.

Exemplary Mixing Technology

Figure 4A:
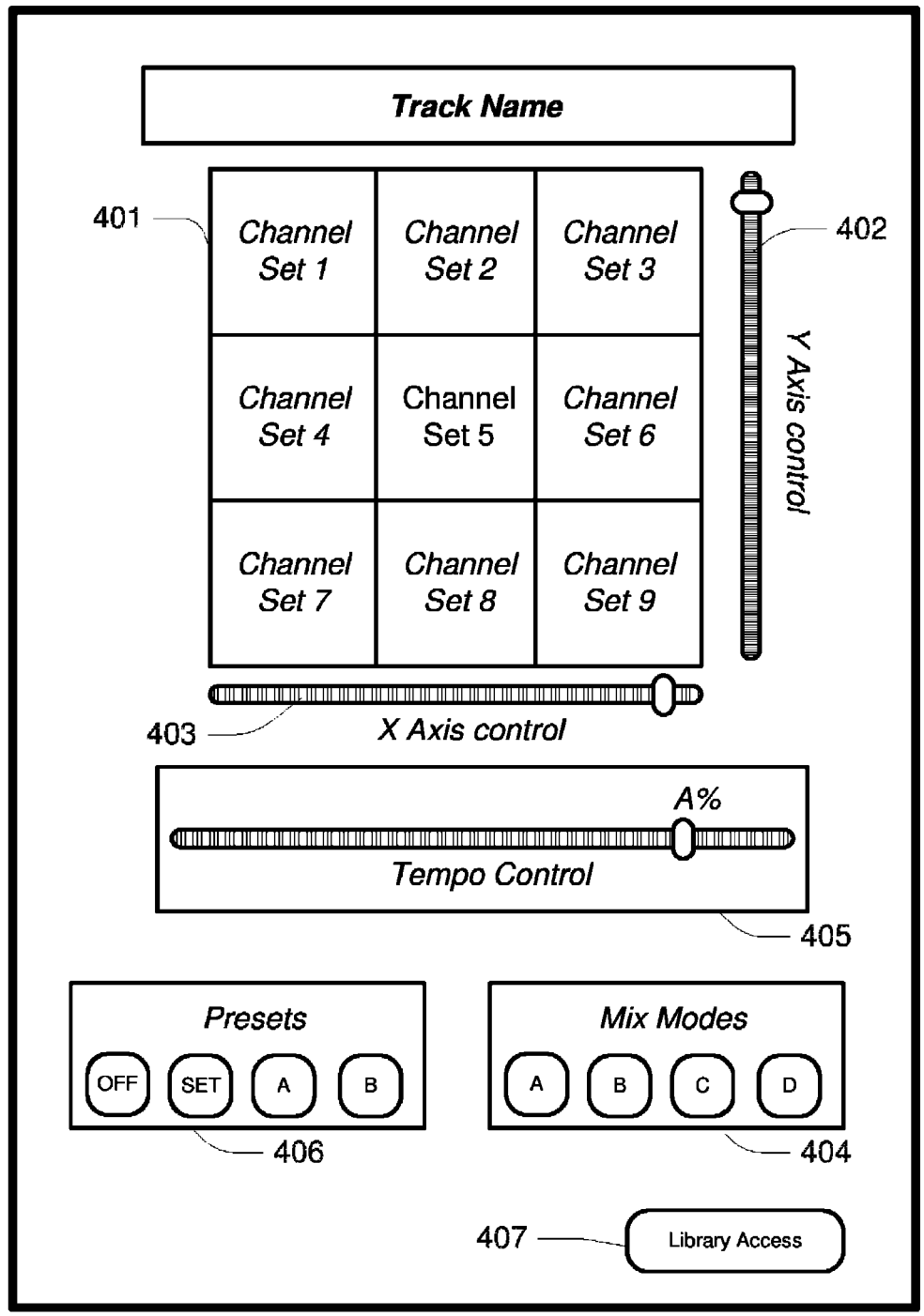
FIG. 4A to FIG. 4C illustrate exemplary screenshots according to one embodiment.

FIG. 4A provides an exemplary screenshot from a plug-in according to one embodiment. The interface objects displayed in this screenshot could also be provided natively via an editor application.

Object 401 displays a grid representing individual channels, or combinations of channels. In the example of FIG. 4A, there are nine boxes in object 401, which each relate to a channel or combination of channels. These may, by way of example, represent the following musical aspects:

High pad.
Mid pad.
Low pad.
Bass percussion.
Snares.
Glitch percussion.
High pitch long notes.

Figure 4B:
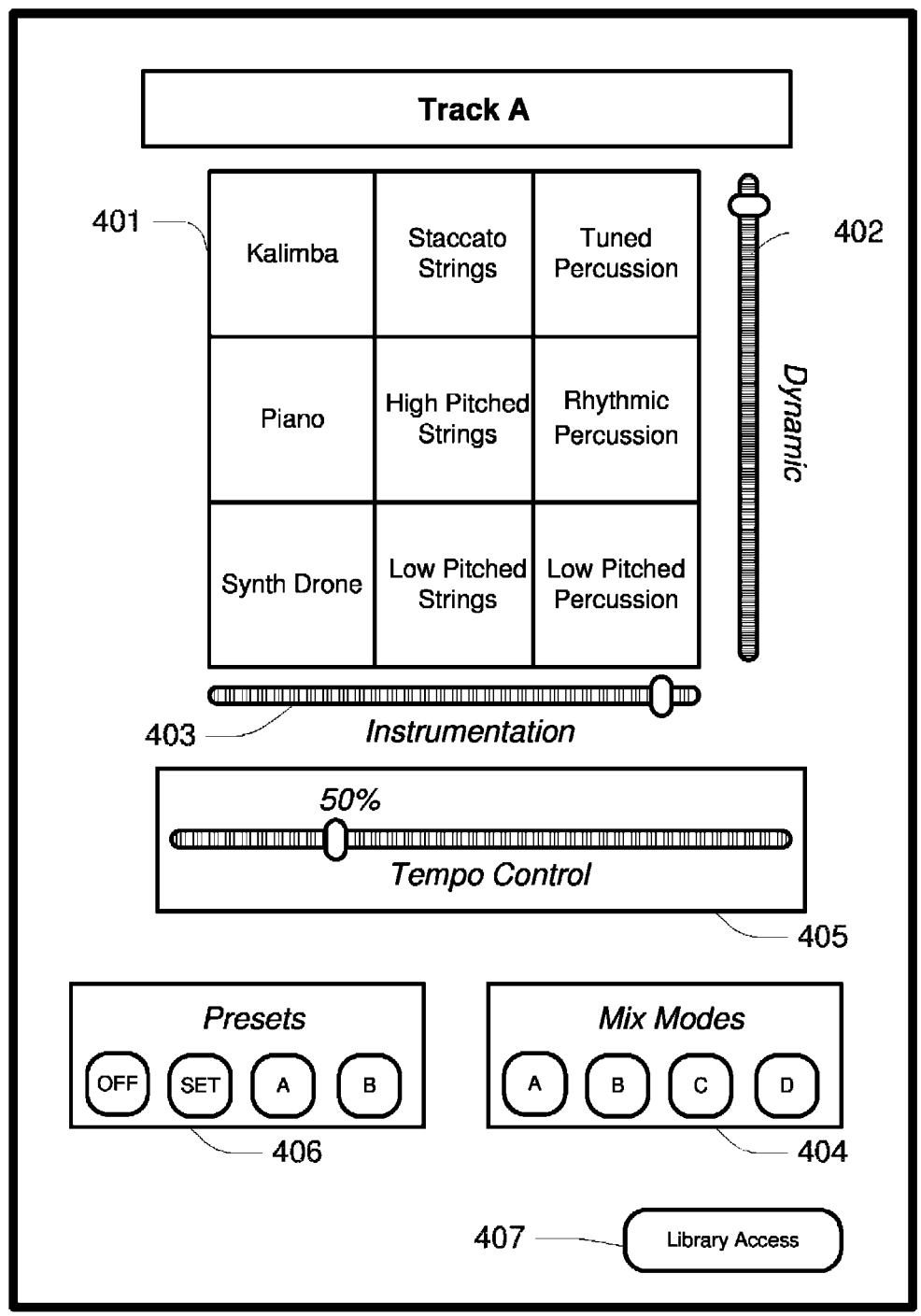
Figure 4C:
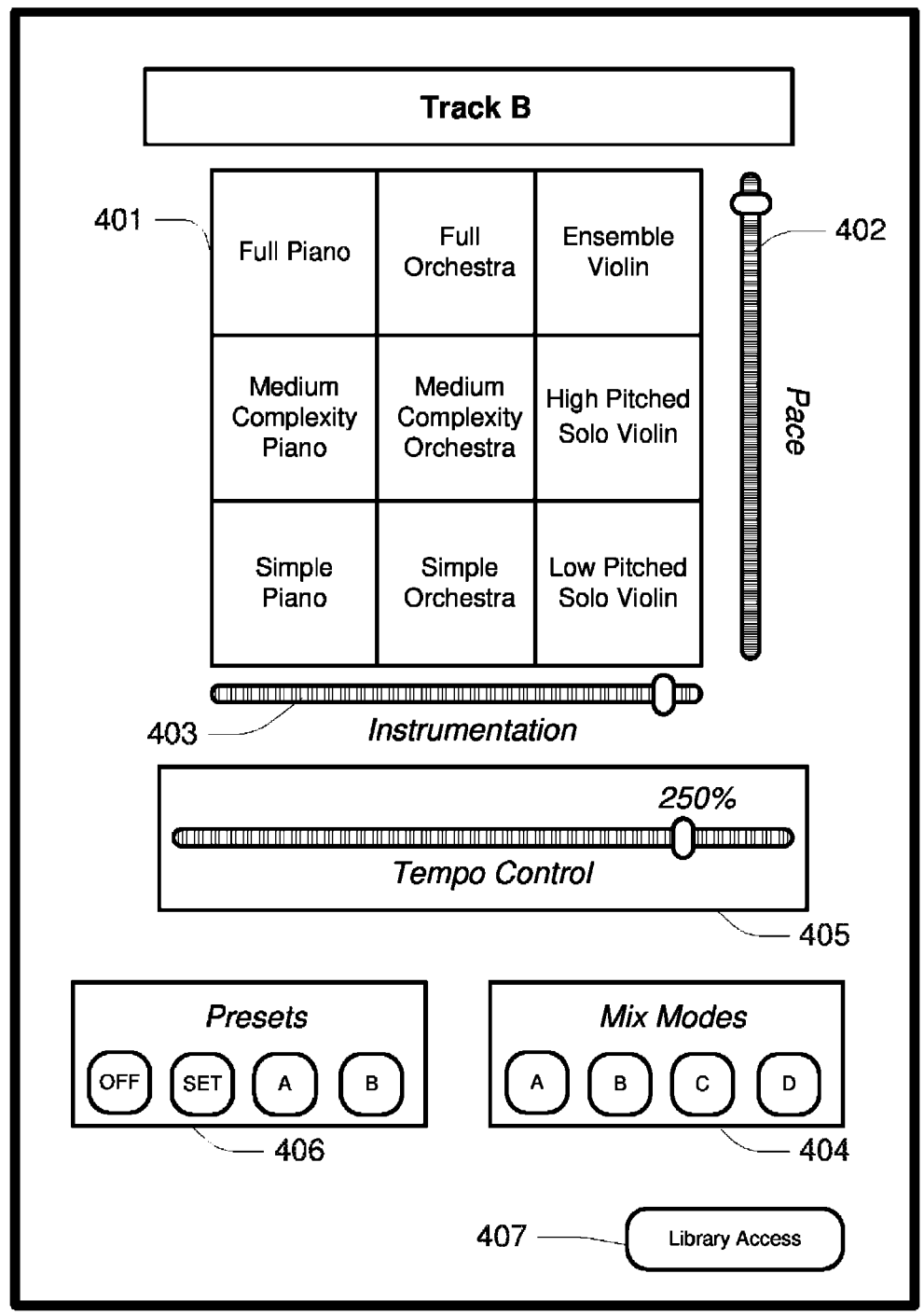

Other examples are provided in FIG. 4B and FIG. 4C.

The grid is arranged such that, from a musical perspective, musical "density" increases along y-axis 402, and musical "tension" increases along x-axis 403. For example, if only the channel(s) providing low pads were to be played, that would create a low-density, low-tension musical arrangement. Strong tremolos, on the other hand, contribute significantly to both high tension and high density. The position of sliders on the x-axis 403 (tension) and y-axis 402 (density) controls mixing of a multi-channel file. The mixing is also controlled by a mix-mode controller 404, which defines a plurality of "mix modes". These "mix modes" determine the effect of movement along either the x-axis and y-axis, specifically whether that movement results in combination (i.e. combining channels along the axis, for example adding glitch percussion to low pad when moving along the x-axis) or focusing (i.e. using only one channel at a time, for example for example replacing low pad with glitch percussion when moving along the x-axis). Mix modes may include: "combine X, focus Y", "focus X, combine Y", "focus X, focus Y", and "combine X, combine Y". Preferably, movement along a given axis is incremental in terms of mixing effect, using cross-fading and/or relative intensity management. For example, a position 50% along the x-axis of FIG. 1 in a combine X mode might represent 100% intensity of low pad and 50% intensity of glitch percussion.

In overview, automation tracks are preferably used to control position on the x-axis and y-axis over time relative to a video track (and hence control mixing of channels). For example, a user may define a line graph automation track for each axis independently. In some embodiments a user is able to define such an automation track in real-time by manually manipulating sliders on the x-axis and/or y-axis during preview playback of the video and multi-channel file. That is, a user watches a preview of video playback, and simultaneously manipulates one of the sliders to control musical effect during the video, with the user's manual interaction being saved as an automation track (which may subsequently be fine-tuned manually).

In some embodiments cues may be added to automation tracks thereby to control functions of the interface of FIG. 4, for example a cue which triggers a change in mix mode at a particular point in time relative to a video file, add an audio filter, or adjust other parameters.

It will be appreciated that other graphical means may be used thereby to represent mixing of channels, for example using additional axis, multiple single/multiple axis objects, and so on. In some cases, where a grid is used, a user is able to modify the channels represented by each grid position.

Grid-Based Mixing

Following on from examples discussed above, one embodiment provides a method for enabling mixing of a multi-channel file. The method includes defining a grid having an x-axis and a y-axis. The grid is defined by a plurality of spaces, each space corresponding to either a single channel of the multi-channel file; or a combination of channels of the multi-channel file. In some cases a user is enabled to modify the makeup of the grid (for example by designating a specific channel or combination of channels for each grid position). The method further includes, based upon user input, defining a respective automation track for each axis. For example, this may take the form of a line graph. Each automation track defines time-specific values for its axis relative to a media timeline (for example a media timeline that is used to synchronise audio, video). The method then includes mixing the multi-channel file based on the time-specific values, such that relative intensities of the channels is determined based the time specific values. In this manner, the method may provide mixing parameters for other methods considered wherein. In some embodiments the mixing at is additionally responsive to a user-selected mix mode, wherein the mix mode defines whether progression along a given axis from one space to another results in combining of the corresponding channels, or cross-fading of the corresponding channels. A slider is preferably provided for each axis, a slider that is configured to be manipulated by a user thereby to control mixing in real time. Manipulation of a given one of the sliders by the user results in generation of an automation track for the associated axis based upon the user manipulation.

Tempo Control

In some embodiments, the technology described above is enhanced to enable tempo control, preferably dynamic (real time) tempo control.

A preferred approach is to enable control over tempo in a manner similar to that in which other mixing parameters are controlled. That is, a user interface control object is provided (for example a slider), in combination with an automation track. So, for example, a user manipulates the control object thereby to modify desired tempo (for example as a percentage of a baseline original tempo defined for the file, which may be defined in BPM) of multi-channel file playback relative to a timeline. In this manner, tempo may increase and/or decrease at various points in the timeline, as defined by an automation track.

Figure 2B:
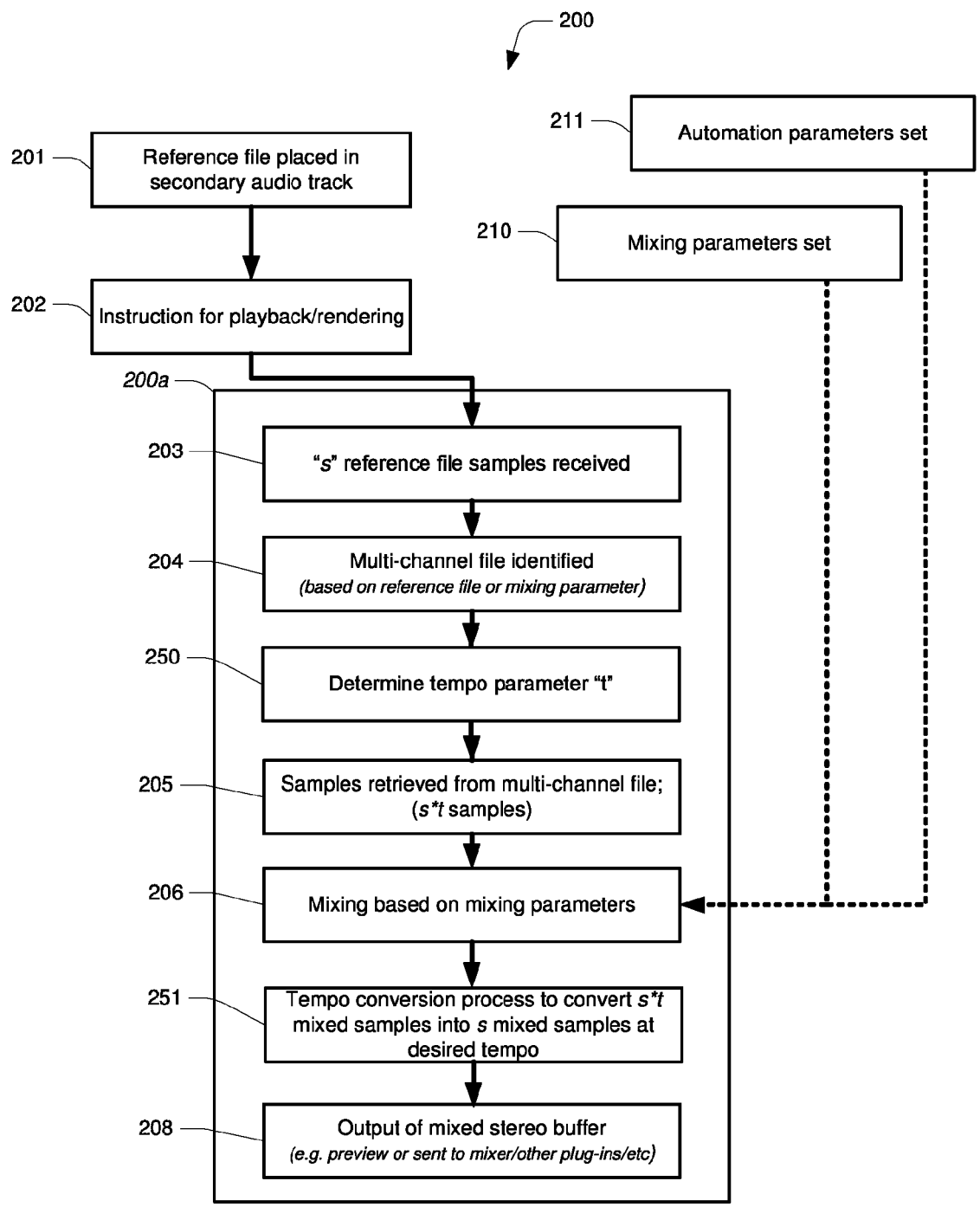
FIG. 2B illustrates a method according to one embodiment.

As previously described by reference FIG. 2A, various embodiments leverage a process including receiving reference file samples at 203 and subsequently retrieving samples from a multi-channel file at 205. The retrieved samples are mixed at 206, and output provided. Accommodating tempo control is optionally achieved by using a tempo parameter, which is set by a user, for example via an automation track, and identified by the software at step 250 in FIG. 2B, thereby to control a number of samples retrieved from the multi-channel file at 205. Specifically, if we assume that s samples are received from the reference file at 203, s*t samples are retrieved from the multi-channel file at 205, where t is a tempo parameter defined by way of user input (for example in the context of defining tempo for an automation track). For example, if the user has set half-speed tempo, t is set to 0.5, and half as many samples are retrieved. If the user has set double tempo, then t is set to 2, and twice as many samples are retrieved. Furthermore, as shown in FIG. 2B (to be added), an additional tempo compression process 251 is performed (preferably, as shown, following mixing), whereby the s*t samples are converted into s samples (tempo compression without pitch adjustment) thereby to output audio data at the user-desired tempo.

By way of example, assume 1024 samples are received from the reference file, and the tempo parameter is 2, then 2048 samples are retrieved from the multi-channel file, mixed according to mixing parameters, and compresses to return 1024 mixed samples for playback (or the like).

It will be appreciated that this form of tempo control may additionally be used in other situations, thereby to allow real time tempo control using an automation track. It will be appreciated that, ordinarily, if a plugin receives 1024 samples and is instructed to double tempo, then 512 samples are returned with no way to fill remaining time. By the present approach, additional samples are retrieved (and optionally mixed) prior to compression, allowing a full 1024 samples to be returned.

CONCLUSIONS AND INTERPRETATION

It will be appreciated that the disclosure above provides various significant systems and methods for enabling interaction with multi-channel media files.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention.

For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for processing media data, the method including:
   (i) receiving a buffer of first-format samples from an audio track that is placed in a media editing platform;
   (ii) in response to the received first-format samples, obtaining a set of corresponding second-format samples from a multi-channel audio file; and
   (iii) mixing the obtained second-format samples based on a set of mixing parameters, thereby to define a new buffer of first-format samples derived from the mixing of the second-format samples; and
   (iv) outputting the new buffer of first-format samples.

2. The method according to claim 1 wherein the first-format samples are derived from a reference audio file.

3. The method according to claim 2 wherein the reference audio file is coded to refer to an associated multi-channel file.

4. The method according to claim 3 wherein (ii) includes obtaining the set of corresponding second-format samples from the associated multi-channel file.

5. The method according to claim 3 wherein (ii) includes:
   determining whether a user has specified a multi-channel file other than the associated multi-channel file;
   where the user has not specified a multi-channel file other than the associated multi-channel file, obtaining the set of corresponding second-format samples from the associated multi-channel file; and
   where the user has specified a multi-channel file other than the associated multi-channel file, obtaining the set of corresponding second-format samples from the specified multi-channel file.

6. The method according to claim 2 wherein the buffer of first-format samples include location data indicative of a seek location defined relative to a known origin, and wherein (ii) includes obtaining the set of corresponding second-format samples from a corresponding seek location in the multi-channel audio file.

7. The method according to claim 1 wherein (iii) includes:
   identifying a set of user-defined mixing parameters;
   identifying a set of user-defined automation parameters; and
   for each sample in the set of corresponding second-format samples, applying transformations to one or more channels based upon the set of user-defined mixing parameters and the set of user-defined automation parameters.

8. The method according to claim 7 wherein the multi-channel file includes a plurality of channels respectively corresponding to musical aspects.

9. The method according to claim 8 wherein the multi-channel file includes a plurality of channels respectively corresponding to percussion sounds.

10. The method according to claim 1 including:
    (a) defining a graphical layout including a plurality of spaces, each space corresponding to either:
       (i) a single channel of the multi-channel file; or
       (ii) a combination of channels of the multi-channel file;
    (b) based upon user input, defining one or more automation tracks, wherein each automation track defines time-specific values for facilitating mixing control; and
    (c) determining the mixing parameters based upon the time-specific values.

11. The method according to claim 10 wherein the graphical layout includes x-axis and a y-axis, and wherein (b) includes, based upon user input, defining a respective automation track for each axis, wherein each automation track defines time-specific values for its axis relative to a media timeline.

12. The method according to claim 11 wherein the graphical layout includes a grid.

13. A method for enabling mixing of a multi-channel file, the method including:
    (a) defining a graphical layout including a plurality of spaces, each space corresponding to either:
       (i) a single channel of the multi-channel file; or
       (ii) a combination of channels of the multi-channel file;
    (b) based upon user input, defining one or more automation tracks, wherein each automation track defines time-specific values for facilitating mixing control; and
    (c) mixing the multi-channel file based on the time-specific values, such that relative intensities of the channels is determined the time specific values.

14. The method according to claim 13 wherein the graphical layout includes x-axis and a y-axis, and wherein (b) includes, based upon user input, defining a respective automation track for each axis, wherein each automation track defines time-specific values for its axis relative to a media timeline.

15. The method according to claim 14 wherein the graphical layout includes a grid.

16. The method according to claim 14 wherein the mixing at (c) is additionally responsive to a user-selected mix mode, wherein the mix mode defines whether progression along a given axis from one space to another results in combining of the corresponding channels, or cross-fading of the corresponding channels.

17. The method according to claim 14 including providing, for each axis, a slider that is configured to be manipulated by a user thereby to control mixing in real time.

18. The method according to claim 14 wherein manipulation of a given one of the sliders by the user results in generation of an automation track for the associated axis based upon the user manipulation.

19. The method according to claim 13 wherein each automation track has a timeline corresponding to a video timeline.

20. The A method according to claim 1 wherein the method is performed by a media editing program.

21. The method according to claim 1 wherein the method is performed by a plug-in associated with a media editing program.

* * * * *